US006493806B1

(12) United States Patent
Royer, Jr. et al.

(10) Patent No.: US 6,493,806 B1
(45) Date of Patent: Dec. 10, 2002

(54) METHOD AND APPARATUS FOR GENERATING A TRANSPORTABLE PHYSICAL LEVEL DATA BLOCK TRACE

(75) Inventors: Robert J. Royer, Jr., Beaverton, OR (US); Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/525,199

(22) Filed: Mar. 14, 2000

(51) Int. Cl.[7] .............................................. G06F 12/00
(52) U.S. Cl. ...................................... 711/156; 711/112
(58) Field of Search .................................. 711/112, 156

(56) References Cited

U.S. PATENT DOCUMENTS

| | | | | |
|---|---|---|---|---|
| 5,754,888 A | * | 5/1998 | Yang et al. .................... 710/52 |
| 5,802,593 A | * | 9/1998 | Grimsrud ..................... 711/165 |
| 5,845,297 A | * | 12/1998 | Grimsrud et al. ............ 707/205 |
| 6,059,835 A | * | 5/2000 | Bose ............................ 703/19 |
| 6,145,121 A | * | 11/2000 | Levy et al. ..................... 717/4 |
| 6,269,410 B1 | * | 7/2001 | Spasojevic ..................... 710/5 |

* cited by examiner

Primary Examiner—Reba I. Elmore
(74) Attorney, Agent, or Firm—Mark V. Seeley

(57) ABSTRACT

A system and method for generating a transportable physical level data block trace for a computer system. The method comprises capturing a first physical level data block trace on a first computer system, then performing a reverse file system lookup to generate a logical representation of that trace. That logical representation may be delivered to a second computer system, which may perform a file system lookup to convert the logical representation to a second physical level data block trace for a sequence of disk block accesses resulting from executing an application on the second computer system.

9 Claims, 3 Drawing Sheets

Logical Representation of Physical Trace

| Access | Operation | Offset into File | Length of Transfer | File Name |
|---|---|---|---|---|
| 0 | Read/write/open | $P_0$ | $b_0$ | |
| 1 | " | $P_1$ | $b_1$ | |
| ⋮ | " | " | " | |

63, 65, 67, 69, 71 → 61

Trace Data

| Access | Blocks | |
|---|---|---|
| 0 | $S_1$ | |
| 1 | $S_2$ | |
| 64 ⋮ | 66 ⋮ | |

44 / 62 /

600 Resolve path name substitution

601 Convert logical trace to physical level trace

602 Perform data block allocation optimization

METHOD AND APPARATUS FOR GENERATING A TRANSPORTABLE PHYSICAL LEVEL DATA BLOCK TRACE

FIELD OF THE INVENTION

The present invention relates to computer systems. More specifically, the invention relates to a method for generating a data block trace (representing a sequence in which data blocks are loaded from a storage device to memory) that can be transmitted across platforms.

BACKGROUND OF THE INVENTION

The speed at which data blocks are loaded into memory from a storage device (e.g., a hard disk, CD or DVD) may depend upon how those blocks are distributed on the device and the sequence with which they are accessed. By optimizing those blocks' arrangement for a given access sequence, improved overall access time for a sequence of disk accesses may be achieved. Such an intelligent reordering may be realized by (1) tracing the sequence of data block accesses to determine the current data block allocation, then (2) optimizing data block allocation, using the trace results, to improve access time. Processes for performing such data block reallocation are described in U.S. Pat. Nos. 5,787,296; 5,802,593; 5,890,205; and 5,920,896—each assigned to this application's assignee.

In the processes that these patents describe, the tracer for tracing disk accesses comprises programming instructions that are stored on a computer system's disk drive. As mentioned in U.S. Pat. No. 5,845,297, also assigned to this application's assignee, the tracer may trace logical file accesses, and then map them to physical disk block accesses. Alternatively, the tracer may trace the physical block accesses directly. The tracer may be part of a standalone utility, or part of an installation utility integrated into an application. Alternatively, the tracer may be integrated with the operating system.

When both the tracer and the data block reallocator are installed on the same platform, the process by which they trace and reorder data block accesses for an application may be relatively complicated for a user. Removing the tracing burden from such a process could simplify that operation for the user. This may be accomplished by performing the tracing operation for the application of interest separately from performing the data block reordering operation. Such a trace, which represents disk access sequence information, may be provided to an unlimited number of computer systems. Those systems may use that trace to optimize the data block allocation for the application, as executed on them.

Transporting accurate disk access sequence information from one system to another is not, however, a straightforward task. Such a trace may consist of a sequence of low level physical data blocks, e.g., a record of low level physical hard drive transactions. Although a physical trace may be more accurate than a logical trace, it is system and state dependent. Such a trace may become invalid, even on the system from which it was made, if moving data on the hard drive (resulting from hard drive use) negates the trace's accuracy.

Such a trace may instead consist of a logical file system trace. Such a trace records hard drive traffic, as reported by the computer's operating system. While this type of trace is more portable than a physical trace, it may not be as accurate as a physical trace because it is captured at a relatively high level in the operating system's driver stack. For that reason, a logical file system trace may not accurately reflect physical hard drive transactions.

Accordingly, there is a need for an apparatus and method that enables a physical level data block trace to be transported across multiple systems and configurations. There is a need for such an apparatus and method that enables transmission of such a physical trace by abstracting it into a device independent format. The present invention provides such an apparatus and method.

DETAILED DESCRIPTION OF THE PRESENT INVENTION

A system and method for generating a transportable physical level data block trace, and for using it to generate a corresponding physical trace on a target device, is disclosed. In one aspect, the method of the present invention comprises using a computer system to capture a physical level data block trace, then to generate from that trace an abstracted representation of it that has a device independent format. In another aspect, the method of the present invention comprises receiving that abstracted representation on a target device, and generating from it a physical data block trace for a sequence of data block accesses made by an application.

In one embodiment, the system of the present invention includes a processor and a hard drive. In one aspect, the hard drive stores computer-executable instructions that, when executed by the processor, capture a physical level data block trace, then convert that trace to a logical representation of it. In another aspect, the hard drive stores computer-executable instructions that, when executed by the processor, convert that logical representation to a physical level data block trace for a sequence of data block accesses made by an application.

Figure 1:
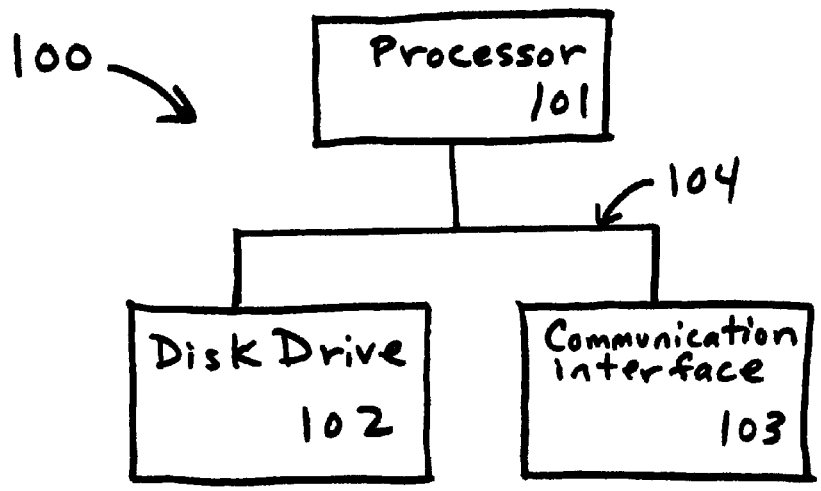
FIG. 1 is a block diagram representing computer hardware that may be used to generate a transportable physical level data block trace.

As shown in FIG. 1, computer system 100 includes processor 101, disk drive 102, and communication interface 103. These components communicate with each other over bus 104. Processor 101 preferably is a Pentium® III or Itanium™ processor manufactured by Intel Corporation, but may be a later generation Intel processor or other Intel Architecture compatible processor, a RISC processor, or other device capable of processing data and instructions. Disk drive 102 may comprise any mechanism that enables data to be read from or written to a rotating disk. Examples include hard disk drives (herein referred to as "hard drives"), CD drives and DVD drives. Communication interface 103 may comprise any mechanism that enables computer system 100 to transfer data to another device. (Bridging components and busses that may be located between processor 101 and bus 104 are not shown so as not to obscure the invention.)

Figure 2:
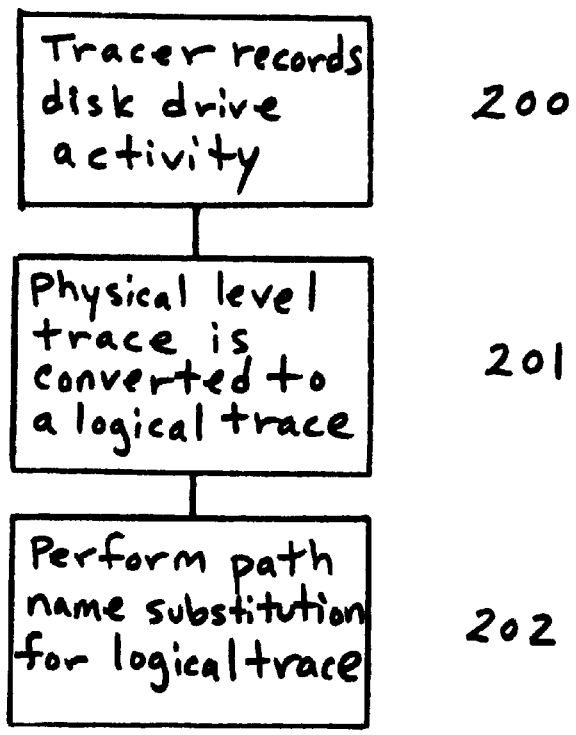
FIG. 2 is a flow chart representing a first aspect of the method of the present invention.

FIG. 2 represents an embodiment of the method of the present invention for generating a transportable physical level data block trace for data blocks accessed from a hard disk. Initially, a tracer records a sequence of disk block accesses for an application of interest (block 200). The resulting physical level trace provides an accurate, but state dependant, trace of hard drive activity. That physical level trace is then converted to a logical representation of that trace, which has a device independent format (block 201). (Because such a logical representation is calculated from the physical trace, it differs from the logical trace mentioned above, which is not derived from the physical trace, but instead represents hard drive traffic captured in the operating system's driver stack.) To ensure that different devices, which may store programs in different directories, can process the previously generated logical trace, a path name substitution may be performed (block 202).

In a preferred embodiment of the method illustrated by FIG. 2, the physical level trace is converted to an equivalent logical representation of that trace by performing a reverse file system lookup. To accomplish this task, which is analogous to a backwards translation of a physical level trace to a logical trace, some searching through file system data structures may be required. When the operating system is Windows® 98, this task may be facilitated as follows. First, a reverse lookup into the file allocation tables is performed. Next, an ordered list of hard drive sector accesses is translated into a corresponding set of references to logical file entries. Each resultant reference specifies a file name, an offset into the file and the length of the transfer. Although this is one example for how a physical level trace may be translated to a logical trace, there are other ways to effect that translation, as will be apparent to those skilled in the art.

Figures 3, 4:
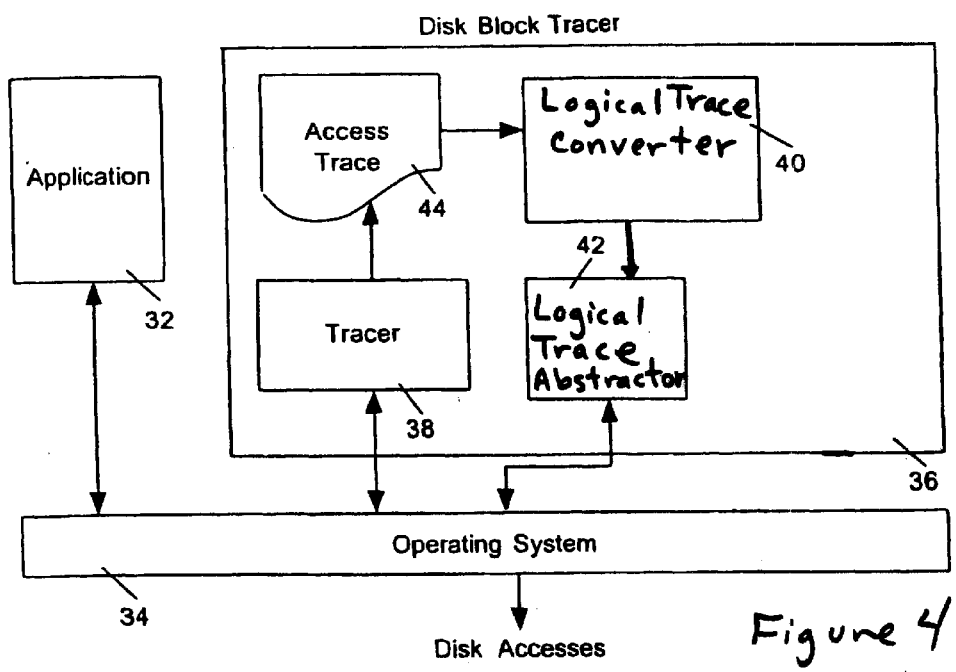
FIG. 3 illustrates one embodiment of a logical representation of a physical level trace.
FIG. 4 represents an embodiment of a disk block tracer that may be used to carry out the method of the present invention.

FIG. 3 illustrates one embodiment of a logical representation of a physical level trace, which may result from this conversion. As shown, for the illustrated embodiment, the logical trace includes a number of file access records 61. Each access record 61 includes an access identifier 63 (which identifies the access sequence number—this identifier is an optional feature), a file name 71 (which identifies the file accessed), the file access operation performed 65 (e.g., read, write or open), an offset into the file accessed 67, and the length of the transfer 69 (e.g., the number of bytes).

Such a logical representation of a physical level data block trace may be further abstracted by performing a path name substitution. Such a path name replacement may comprise a series of macros that a target machine can resolve. For example, a logical file having a path name C:\office\file x\ . . . may be abstracted to <progdir>\file x\ . . . , or <windir>\file x\ . . . (where "progdir" and "windir" stand for "program directory" and "Windows directory," respectively). If the corresponding file, as stored on the target device, is D:\office2\file x\ . . . , then the abstracted logical file may be resolved to that path name by substituting D:\office2 for <progdir> (or <windir>). The target device resolves this at runtime. This may be accomplished by including programming instructions with the abstracted logical file that enable this resolution to take place by enabling the target system directory that contains the corresponding file to be identified, then causing substitution of that directory for the logical file's abstracted prefix. This enables the target machine to translate the abstracted logical file to a path name it comprehends. Whether or not the logical trace is further abstracted in this way, the resulting logical representation of the physical data block information may be recorded or maintained in any one of a number of data structures known in the art.

FIG. 4 represents an embodiment of a disk block tracer that may be used to carry out the method of the present invention. In that embodiment, the disk block tracer is embodied in standalone utility 36, which a user may invoke to generate a transportable physical level data block trace, e.g., one for a sequence of disk accesses made by application 32. Disk block tracer 36 includes tracer 38, logical trace converter 40 and logical trace abstractor 42. Tracer 38 traces the disk accesses made by application 32. In one embodiment, tracer 38 first traces file accesses made by application 32, which are subsequently mapped to physical disk blocks accessed. In an alternate embodiment, tracer 38 traces the physical disk blocks accessed directly.

Figures 5, 6:
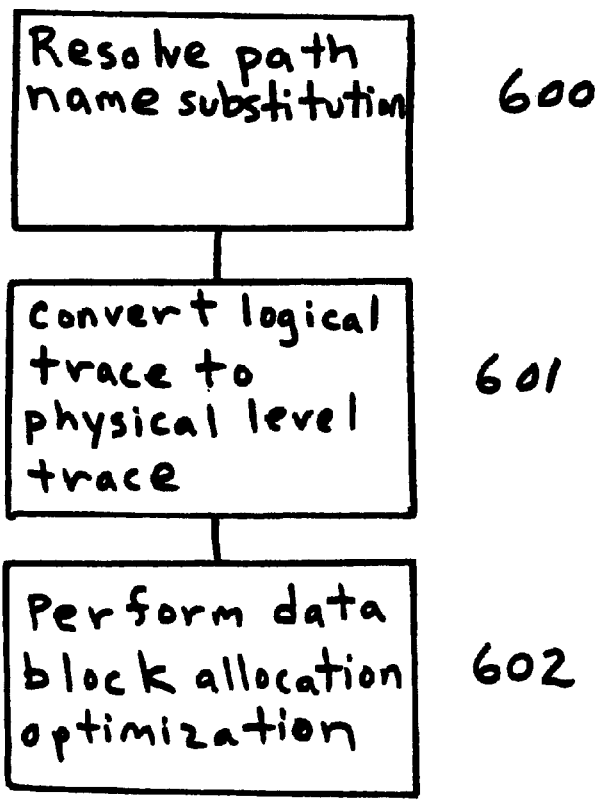
FIG. 5 represents one embodiment of a physical level data block trace.
FIG. 6 is a flow chart representing a second aspect of the method of the present invention.

After completing the trace, tracer 38 logs the results in access trace 44. FIG. 5 illustrates one embodiment of a data structure for maintaining the physical disk block information. As shown, for the illustrated embodiment, the data structure includes a number of physical access records 62. Each physical access record 62 includes an access identifier 64 identifying the access sequence number, and the disk blocks accessed 66. (Each access record 62 may employ an opcode for designating the file access operation to be performed, e.g., read or write.)

After the physical trace is completed, logical trace converter 40 converts that physical trace to a logical representation of it. As described above, this may be accomplished by performing a reverse file system lookup to produce a logical trace having a format like that shown in FIG. 3. Optionally, as already explained, that logical trace may be further abstracted by logical trace abstractor 42. Logical trace abstractor 42 performs a path name substitution for the logical trace to enable machines, which may use different path names for corresponding files, to process the logical trace.

Operating system 34 provides I/O read/write services for accessing disk drives, and application 32 utilizes these I/O read/write services when accessing file data stored on disk drives. Furthermore, operating system 34 provides event notification services, and tracer 38 leverages on these services to directly or indirectly trace disk accesses performed by application 32.

By converting a physical trace to a logical format, the method and apparatus of the present invention abstracts the physical trace information into a format that is unaffected by changes in the state of a machine. Path name substitution increases portability of the logical trace by abstracting it in a way that enables a target machine to resolve it. The resulting abstracted trace may be portable to many different computers while retaining the same accuracy as a physical trace.

FIG. 6 is a flow chart representing a second aspect of the method of the present invention. After an abstracted trace for a particular application is delivered to a target device, the target device will convert that abstracted trace into a physical level trace for a sequence of disk block accesses that result when that application is executed on the target device. Initially, the target device resolves logical file names from the path name substitution (block 600). After logical file names have been resolved, the logical trace is converted to a physical level disk block trace for a sequence of disk block accesses for the application of interest (block 601). After that conversion, the target device may use that physical trace for various purposes—such as to optimize disk block allocation for the application (block 602).

In a preferred embodiment of the method illustrated by FIG. 6, the logical trace is converted to an equivalent physical level trace by performing a file system lookup. FIG. 3, described above, illustrates one embodiment of a logical access trace, which may be converted into a physical level trace. When performing a file system lookup to realize that conversion, on a system that uses Windows 98, the method of the present invention does a lookup into the file allocation tables to translate a set of entries (each including a file name, offset and length of transfer) into an ordered list of corresponding hard drive sector accesses. That list constitutes the corresponding physical trace. During that conversion, the references are validated. Any that are invalid for the target system are removed.

The resulting physical trace may be used to reallocate data blocks to improve access time. Procedures for optimizing data block allocation are described in U.S. Pat. Nos. 5,787,296; 5,802,593; 5,845,297; 5,890,205; and 5,920,896, and will not be repeated here.

The system and method of the present invention enables improved performance for an application executed on a target system without requiring that system to capture the physical level hard drive trace used to optimize data block allocation for that application. Instead, an accurate physical level trace of the application of interest may be captured in a lab environment, then distributed in abstracted form to the target system. The target system may then translate that abstracted trace into a physical trace that may be used in the optimization process. Such an abstracted trace may be delivered to the target system in various ways, e.g, via a web site download or by delivering a floppy disk or another type of self-contained storage device. The logical trace may be delivered to the target device with the application, and/or the optimization program. That trace and/or program may be integrated into the application, or stored separately. In other embodiments, the application may be loaded onto the target system before the trace and optimization program are delivered, or both the application and the optimization program may be stored on the target system (the program may or may not be integrated with the application) before the logical trace is delivered.

Although the foregoing description has specified a system and method for generating a transportable physical level data block trace, and for using it to generate a corresponding physical trace on a target device, those skilled in the art will appreciate that many modifications and substitutions may be made. For example, although the embodiments described above are presented in the context of tracing and reallocating data block accesses from a hard disk, the above described system and method may be applied to other storage media, such as, for example, writable CDs and DVDs. Accordingly, it is intended that all such modifications, alterations, substitutions and additions be considered to fall within the spirit and scope of the invention as defined by the appended claims.

What is claimed is:

1. A method for generating a transportable physical level data block trace comprising:
   using a computer system to capture a physical level data block trace; and
   generating from that physical level data block trace an abstracted representation of that trace, which has a device independent format, wherein the abstracted representation of the physical level data block trace is a logical representation of that trace that is generated by performing a reverse file system lookup.

2. The method of claim 1 further comprising substituting a generic designation for a path name corresponding to the logical representation of the physical level data block trace.

3. The method of claim 2 further comprising transmitting the logical representation of the physical level data block trace to a target computer system.

4. A method for generating a logical trace corresponding to a physical level hard disk trace comprising:
   capturing a physical level hard disk trace on a computer system; and
   performing a reverse file system lookup to generate a logical representation of the physical level hard disk trace.

5. The method of claim 4 further comprising substituting a generic designation for a path name corresponding to the logical representation of the physical level hard disk trace.

6. A computer system comprising:
   a processor; and
   a hard drive storing computer-executable instructions that, when executed by the processor, capture a physical level data block trace, then convert that physical level data block trace to a logical representation of that trace, wherein the computer-executable instructions convert the physical level data block trace to a logical representation of that trace by performing a reverse file system lookup.

7. The system of claim 6 wherein the computer-executable instructions further substitute a generic designation for a path name corresponding to the logical representation of the physical level data block trace.

8. A computer-readable medium having computer-executable instructions stored therein that, when executed by a processor, cause a physical level data block trace to be captured, then cause that physical level data block trace to be converted to a logical representation of the physical level data block trace, wherein the computer executable instructions convert the physical level data block trace to a logical representation of that trace by performing a reverse file system lookup.

9. The computer-readable medium of claim 8 wherein the computer-executable instructions cause a generic designation to be substituted for a path name corresponding to the logical representation of the physical level data block trace.

* * * * *